July 17, 1928.
B. L. WHITED
MATERIAL WORKING MACHINE
Filed Oct. 7, 1924    2 Sheets-Sheet 2
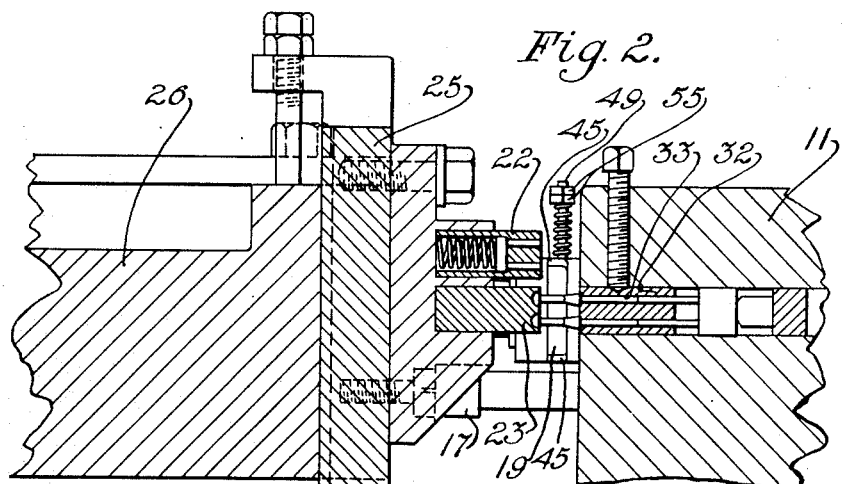
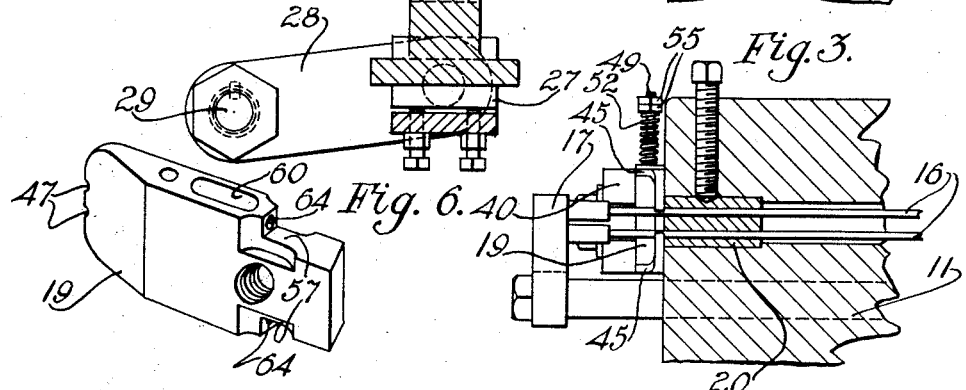
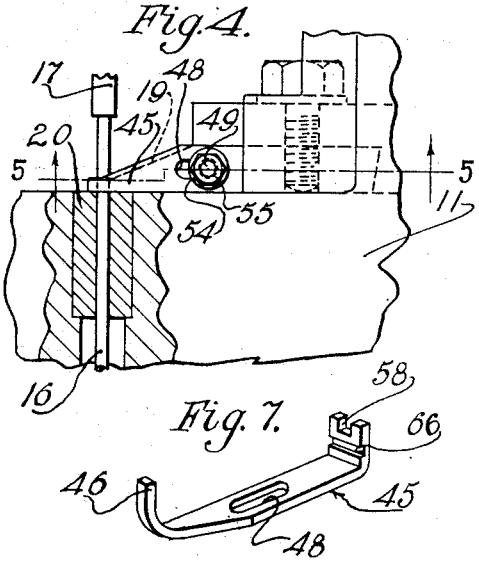
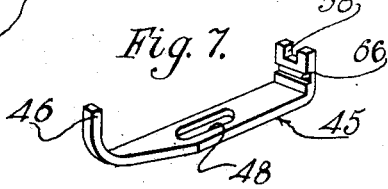
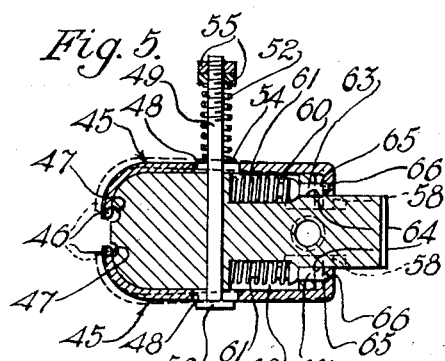
Inventor
Burns L. Whited
by H. A. Patterson
Atty.

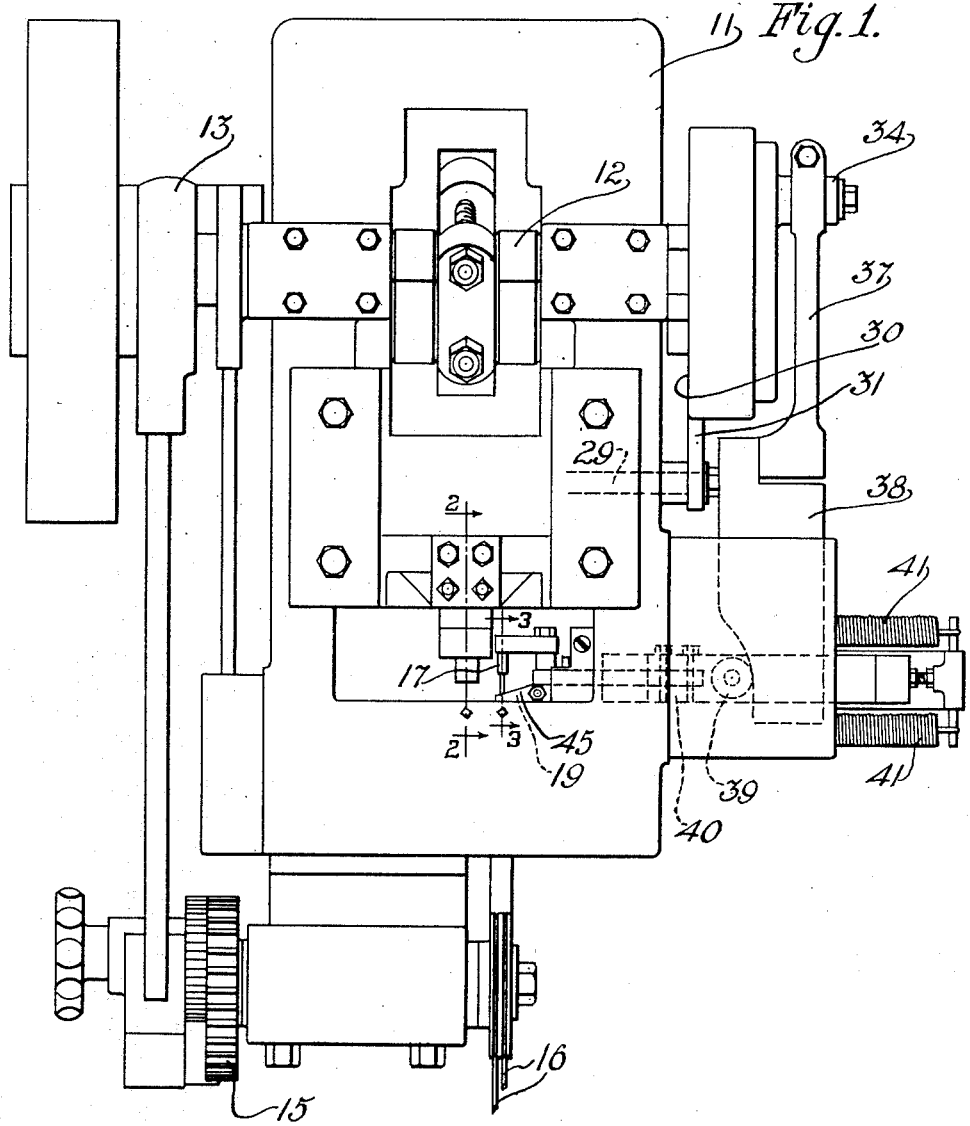

Patented July 17, 1928.

1,677,159

UNITED STATES PATENT OFFICE.

BURNS LEE WHITED, OF CHICAGO, ILLINOIS, ASSIGNOR TO WESTERN ELECTRIC COMPANY, INCORPORATED, OF NEW YORK, N. Y., A CORPORATION OF NEW YORK.

MATERIAL-WORKING MACHINE.

Application filed October 7, 1924. Serial No. 742,163.

This invention relates to a material working machine, and more particularly to a material carrier therefor.

An object of the invention is to provide an improved carrier for transferring a body of material from one position to another in a material working machine.

One form of the invention is embodied in a machine for simultaneously heading a pair of blanks from which screws are to be manufactured. The blanks are cut from continuous strands of material and are transferred to a position wherein they are aligned with suitable heading dies. The means for transferring the blanks to the heading position comprises a cut-off blade adapted to sever the strands, and spring pressed fingers which are adapted to cooperate with the cut-off blade to hold the blanks while they are being brought to the heading position. The fingers and springs are carried by the cut-off blade, two of the springs being disposed within the blade. The arrangement is such that the fingers slip off the blanks when the blanks are engaged by dies in the heading position and the cut-off blade is withdrawn from that position.

Other objects and features of the invention will become apparent as the detailed description progresses, reference being had to the accompanying drawings, wherein Fig. 1 is a plan view of a heading machine embodying the invention;

Figs. 2 and 3 are sections taken on lines 2—2 and 3—3, respectively of Fig. 1;

Fig. 4 is a fragmentary plan view partly in section of some of the parts shown in Fig. 1;

Fig. 5 is a section taken on line 5—5 of Fig. 4, and

Figs. 6 and 7 are perspective views of certain parts of the improved machine.

Referring for the present to Figs. 1 and 2, 11 indicates the frame of a machine embodying the invention and comprising a crank shaft 12, which is driven by any suitable means (not shown). An eccentric 13, driven by the crank shaft 12, actuates a feeding mechanism 15 adapted to intermittently advance continuous strands 16 against a stop 17. Each time the strands 16 are advanced against the stop 17 a cut-off blade 19 cooperates with a die block 20 to sever the strands. The severed sections of the strands constitute blanks which are headed by an upsetting die 22 and a finishing die 23 (Fig.2), screw threads being susequently rolled upon the headed blanks in another machine.

Means hereinafter described cooperate with the cut-off blade 19 to transfer the blanks from the position wherein they rest against the stop 17 to a position wherein they may be engaged by the dies 22 and 23. The dies 22 and 23 are mounted on a slide 25 journaled in a slide 26 which is reciprocated by the crank shaft 12. The slide 25 also makes sliding engagement with a block 27 pivotally mounted on the free end of the lever 28 secured to a shaft 29 journaled in the frame 11. A cam 30 constrained to rotate with the crank shaft 12, oscillates the shaft 29 through the medium of a lever 31. The machine is so designed that the crank shaft 12 will cause the dies 22 and 23 to be reciprocated twice during each cycle of operation, so that the upsetting die 22 will first upset an end of each blank, and then the finishing die 23 will complete the head on each blank, the slide 25 being reciprocated by the lever 31 to alternately bring the upsetting die 22 and the finishing die 23 into alignment with a die block 32 having bores 33 adapted to receive the shank portions of the blanks.

This invention is not particularly concerned with the construction of the above described apparatus for heading the blanks, but is concerned with the means for severing the strands 16 and for bringing the blanks so formed to the heading position.

Pivotally secured to a crank pin 34 constrained to rotate with the crank shaft 12 is a lever 37 which is pivotally connected to a cam plate 38 slidably mounted in the frame 11. An anti-friction roller 39 mounted on a slide 40 is urged into engagement with the cam plate 38 by tension springs 41. The slide 40 carries the cut-off blade 19. The construction is such that the cut-off blade 19 will be reciprocated once during each cycle of operation of the machine to sever the strands 16 and to transfer the blanks so formed to the heading position, means carried by the blade being adapted to cooperate with it to hold the blanks while they are being brought to the heading position.

The means cooperating with the cut-off blade 19 to hold the blanks comprises a plurality of fingers 45, each of which is provided with an arcuate end 46 associated with one of a plurality of cutting edges 47 provided upon the cut-off blade. Formed in each finger 45 is a slot 48 through which passes a pin 49 slidably mounted in the cut-off blade. The pin 49 is provided with a head 50 which is urged against the lowermost finger 45 by a compression spring 52 disposed around the pin. One end of the compression spring 52 urges a washer 54 against the uppermost finger 45, the other end of the spring resting against a plurality of nuts 55 threaded upon the pin 49. The blade 19 is provided with ribs 57 adapted to engage slots 58 in the fingers 45. This construction prevents lateral displacement of the fingers 45 relative to the blade.

Disposed in recesses 60 formed in the blade 19 are helical compression springs 61, one being provided for each finger 45. One end of each spring 61 bears against the blade 19 and the other end thereof bears against a pin 63 slidably journaled in a bore 64 formed in the blade. The pins 63 are provided with lugs 65 which engage grooves 66 formed in the fingers 45 so that the fingers are loosely pivoted on the blade. The compression spring 52 cooperates with the compression springs 61 to yieldingly hold the fingers 45 in the positions wherein they are shown in full lines in Fig. 5. When the continuous strands 16 are advanced against the stop 17 the strands enter between the arcuate ends 46 of the fingers and the cutting edges 47 formed upon the blade 19. Then as the blade is advanced to sever the strands, the fingers 45 will prevent the displacement of the blanks relative to the blade until the blanks have been forced some distance into the bores 33 by the die 22 and the blade 19 is retracted from the heading position. When the blade 19 is retracted from the heading position the spring 52 and the springs 61 will yield and permit the arcuate ends 46 to slip over the blanks in the manner illustrated in dotted lines in Fig. 5.

What is claimed is:

1. In material working apparatus, means for transferring a body of material from one position to another and comprising reciprocatory means, a cut-off blade carried by the reciprocatory means, and means including a plurality of yielding means carried by the cut-off blade and acting substantially at right angles to each other for holding the material against the blade.

2. In material working apparatus, means for transferring a body of material from one position to another and comprising a movable member, and means carried by the member including a plurality of yielding means acting substantially at right angles to each other for constraining the material to move with the member.

3. In material working apparatus, means for transferring a body of material from one position to another and comprising a movable member, and means carried by the member including a plurality of springs under compression acting substantially at right angles to each other for constraining the material to move with the member.

4. In material working apparatus, means for transferring a plurality of pieces of material from one position to another and comprising a movable member, a plurality of elements adapted to engage said pieces of material, a yielding means common to said elements carried by the member and controlling the movements of the elements in one direction, a second yielding means carried by the member and associated solely with one of said elements, and a third yielding means carried by the member and associated solely with another of said elements said second and third yielding means controlling the movements of the elements in another direction.

5. In material working apparatus, means for transferring a body of material from one position to another and comprising a movable die member, and means carried by the member including a plurality of yielding means acting substantially at right angles to each other for constraining the material to move with the die member.

6. In material working apparatus, means for transferring a body of material from one position to another and comprising a die member having a cutting edge, a plate having a portion thereof associated with the cutting edge adapted to engage the material, and a plurality of yielding means carried by the member and acting substantially at right angles to each other for preventing displacement of said portion relative to said cutting edge.

7. In a blank heading apparatus, a heading die, a die block for holding a blank in position to be headed thereby, reciprocating means for severing a blank from a piece of stock and transferring the blank to the die block, a member carried thereby and so mounted as to be reciprocable and oscillatable relative thereto, and resilient means for normally causing the member to retain the blank in the reciprocating means but permitting a combined reciprocation and oscillation thereof to release the blank when positioned in the die block.

8. In a blank heading apparatus, a multiple heading die, a multiple die block for holding a plurality of blanks in position to be headed thereby, a reciprocating means designed to simultaneously sever the blanks from a plurality of pieces of stock and transfer them to the die block, members carried thereby for retaining the blanks therein during the transfer, said members so mounted as to be independently reciprocable and oscillatable relative to the transfer means, independent resilient means for normally maintaining each of the members in position to retain a blank but permitting a reciprocation thereof relative to the transfer means, and common resilient means for normally maintaining the members against oscillation to cooperate with the independent resilient means to permit the members to oscillate and reciprocate and thereby release the blanks from the transfer means.

In witness whereof, I hereunto subscribe my name this 26 day of September A. D., 1924.

BURNS LEE WHITED.